US012153599B2

(12) United States Patent
Myren

(10) Patent No.: US 12,153,599 B2
(45) Date of Patent: Nov. 26, 2024

(54) DISTRIBUTED DATABASE FOR SEGREGATION OF CONCERNS

(71) Applicant: Rockwell Collins, Inc., Cedar Rapids, IA (US)

(72) Inventor: Jason A. Myren, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/990,062

(22) Filed: Nov. 18, 2022

(65) Prior Publication Data
US 2024/0168970 A1 May 23, 2024

(51) Int. Cl.
G06F 16/24 (2019.01)
G06F 11/34 (2006.01)
G06F 16/2458 (2019.01)
G06F 16/25 (2019.01)

(52) U.S. Cl.
CPC ........ *G06F 16/256* (2019.01); *G06F 11/3409* (2013.01); *G06F 16/2462* (2019.01)

(58) Field of Classification Search
CPC ...... G06F 16/25; G06F 11/34; G06F 16/2458; G06F 16/17; G06F 16/215; G06F 16/21
See application file for complete search history.

(56) References Cited

U.S. PATENT DOCUMENTS

| | | | |
|---|---|---|---|
| 7,346,608 B2 | 3/2008 | Annau et al. | |
| 7,882,268 B1* | 2/2011 | Broido | H04L 61/4511 709/245 |
| 2012/0254692 A1* | 10/2012 | Resch | G06F 11/3006 714/763 |
| 2012/0260037 A1* | 10/2012 | Jibbe | G06F 3/0688 711/170 |
| 2014/0101100 A1 | 4/2014 | Hu et al. | |
| 2017/0147656 A1 | 5/2017 | Choudhary et al. | |
| 2019/0034671 A1* | 1/2019 | Sato | H04B 5/77 |
| 2019/0244663 A1* | 8/2019 | Tomita | G11C 13/003 |
| 2019/0340167 A1* | 11/2019 | Raman | G06F 16/2365 |
| 2020/0169378 A1* | 5/2020 | Ruffini | H04L 7/0075 |
| 2020/0344788 A1* | 10/2020 | Li | H04W 72/21 |

FOREIGN PATENT DOCUMENTS

GB 2496173 A 5/2013

OTHER PUBLICATIONS

Extended European Search Report dated Mar. 14, 2024; European Application No. 23209883.0.

* cited by examiner

*Primary Examiner* — Maher N Algibhah
(74) *Attorney, Agent, or Firm* — Suiter Swantz IP

(57) ABSTRACT

A system and method for accessing data to meet disparate security, integrity, and latency requirements includes multiple databases instantiated in the system with different performance attributes. The system receives a data access request from a client application. The system determines one or more data access requirements associated with the data access request and identify a database or set of databases that conform to those requirements. The system then submits the data access request to the identified databases and returns the result to the client application. The system may determine a data integrity threshold for the data access request, and submit the data access request to two or more databases simultaneously.

15 Claims, 3 Drawing Sheets

DISTRIBUTED DATABASE FOR SEGREGATION OF CONCERNS

BACKGROUND

In avionics applications, systems utilize a variety of databases. Avionics systems also have numerous, disparate data requirements. Different instantiations of database offer different safety, integrity, or latency metrics that may not be suitable for every avionics application. Fixed database architectures do not have the flexibility to meet every requirement of every end instantiation of client applications. Furthermore, database systems that can accommodate strict requirements in even one metric may be cost prohibitive. A unified, cost-effective system and method to access database data is desirable to simplify application access to data and ensure data is stored and processed in ways that meet security and safety requirements.

SUMMARY

In one aspect, embodiments of the inventive concepts disclosed herein are directed to a system and method for accessing data to meet disparate security, integrity, and latency requirements. Multiple databases are instantiated in the system with different performance attributes. The system receives a data access request from a client application. The system determines one or more data access requirements associated with the data access request and identify a database or set of databases that conform to those requirements. The system then submits the data access request to the identified databases and returns the result to the client application.

In a further aspect, the system may determine a data integrity threshold for the data access request, and submit the data access request to two or more databases simultaneously.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
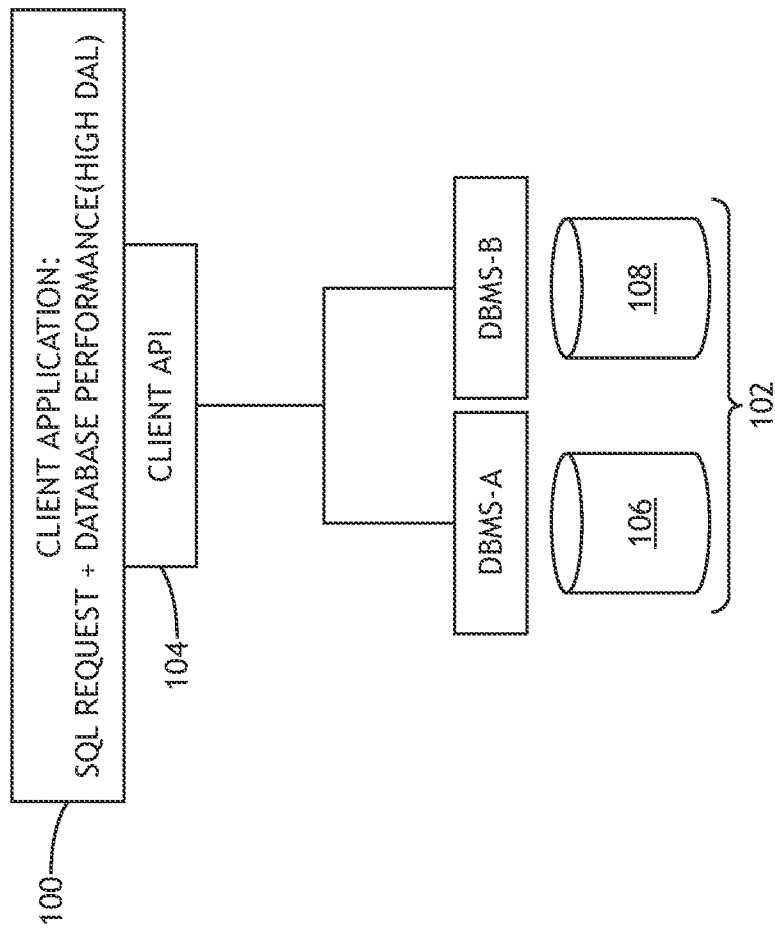
FIG. 1 shows a block diagram of a system suitable for implementing an exemplary embodiment of the present disclosure.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for accessing data to meet disparate security, integrity, and latency requirements. Multiple databases are instantiated in the system with different performance attributes. The system receives a data access request from a client application. The system determines one or more data access requirements associated with the data access request and identify a database or set of databases that conform to those requirements. The system then submits the data access request to the identified databases and returns the result to the client application. The system may determine a data integrity threshold for the data access request, and submit the data access request to two or more databases simultaneously.

Referring to FIG. 1, a block diagram of a system suitable for implementing an exemplary embodiment of the present disclosure is shown. Where a client application 100 attempts to access data from a data source 102, the data access request may be associated with a data integrity metric. The data integrity metric may be associated with the type of data requested or the identity of the client application 100, or the client application 100 may define a data integrity metric based on some algorithm internal to the client application 100, and submit the data integrity metric along with the data access request.

A Client API 104 is interposed in the data path between the client application 100 and the data source 102. In at least one embodiment, the client API 104 receives the data integrity metric associated the data access request and determines if the data integrity metric exceeds some predefined threshold. When the data integrity metric is below the predefined threshold, the client API 104 may access one database 106, 108 in the data source 102 according to a load balancing algorithm to service data access requests with minimal bandwidth usage. When the data integrity metric is above the predefined threshold, the client API 104 may submit the data access request to two or more databases 106, 108 in the data source 102 to increase overall data integrity. The client API 104 may receive data packets from the two or more databases 106, 108 and compare them to each other before forwarding the data to the client application 100. In at least one embodiment, comparing data packets may include the data contained in the data packets or other identifying data such as cyclic redundancy checks (CRC), some hash function output, a signature value, etc., and may comprise a simple comparison to determine if the data packets are identical, and if not, re-querying the two or more databases 106, 108. Alternatively, the client API 104 may utilize the multiple data packets to facilitate robust data integrity checks.

In at least one embodiment, the client API 104 may utilize the data integrity metric to determine a number of databases 106, 108 to query in a sliding scale instead of, or in addition to, a data integrity metric threshold value.

Figure 2:
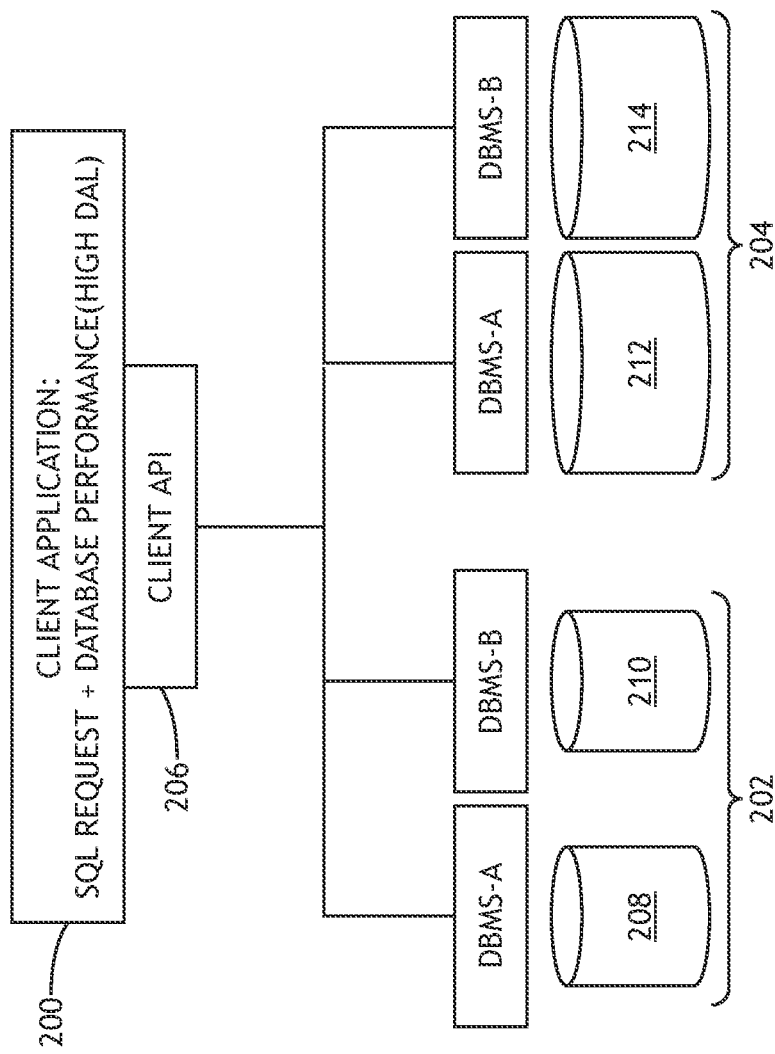
FIG. 2 shows a block diagram of a system suitable for implementing an exemplary embodiment of the present disclosure.

Referring to FIG. 2, a block diagram of a system suitable for implementing an exemplary embodiment of the present disclosure is shown. Where a client application 200 attempts to access data, the data access request may be associated with one or more performance and integrity attributes. In at least one embodiment, the one or more performance and integrity attributes may be associated with the type of data requested or the identity of the client application 200, or the client application 200 may define one or more performance and integrity attributes based on some algorithm internal to the client application 200, and submit the one or more performance and integrity attributes along with the data access request. Such one or more performance and integrity attributes may be defined by a desired latency, integrity, security, storage, etc.

A client API 206 receives the data access request from the client application 200. In at least one embodiment, where the data access request includes one or more performance and integrity attributes, the client API 206 identifies one or more data sources 202, 204 conforming to those one or more performance and integrity attributes, and submits the data access request to one or more databases 208, 210, 212, 214 corresponding to the identified data source 202, 204. Alternatively, or in addition, the client API 206 may determine one or more performance and integrity attributes based on the identity of the client application 200, the type of data being requested, some external factor such a flight phase, etc. It may be appreciated that different database technology offers different technical advantages and corresponding tradeoffs.

In at least one embodiment, a first data source 202 may include databases 208, 210 employing low latency database technology (i.e., high-speed storage media, high-speed routing/switching devices, etc.) while a second data source 204 may include databases 212, 214 may employ cheaper or more robust database technology. Where a data access request is associated with one or more performance and integrity attributes indicating a need for low latency, the client API 206 may route that data access request to one or more databases 208, 210 in the first data source 202. Alternatively, where a data access request is associated with one or more performance and integrity attributes indicating a need for high integrity, the client API 206 may route that data access request to one or more databases 212, 214 in the second data source 204 (where the second data source 204 is configured with high integrity database technology). Furthermore, databases 208, 210, 212, 214 made by different manufacturers are unlikely to fail contemporaneously, at least in their software implementation, without some external source; therefore including a plurality of databases 208, 210, 212, 214 from different manufacturers and featuring different technologies is inherently more robust.

For example, the state of a landing gear in an aircraft is critical. When a query pertaining to the state of the landing gear is received, the client API 206 may select a database 208, 210, 212, 214 of a particularly very high integrity. On the other hand, such database 208, 210, 212, 214 may be very costly per unit of storage. By contrast, a system for reporting available cabin services does not require especially fast or robust databases 208, 210, 212, 214. Embodiments of the present application provide a single data connection point to multiple client applications 200 without a system architect having to individually select and assign databases 208, 210, 212, 214 to particular applications.

In at least one embodiment, the client API 206 may write data to database 208, 210, 212, 214 based on performance and integrity attributes associated with the data, or the client application 200, or both. Such capability provides some redundant capacity as bulk storage may be used if faster, or otherwise more expensive storage becomes unavailable.

In at least one embodiment, the client API 206 may submit the data access request to two or more databases 208, 210, 212, 214 in the corresponding data source 202, 204 to increase overall data integrity. The client API 206 may receive data packets from the two or more databases 208, 210, 212, 214 and compare them to each other before forwarding the data to the client application 200. In at least one embodiment, comparing data packets may comprise a simple comparison to determine if the data packets are identical, and if not, re-querying the two or more databases 208, 210, 212, 214. Alternatively, the client API 206 may utilize the multiple data packets to facilitate robust data integrity checks.

In at least one embodiment, the client API 206 may receive or determine one or more performance and integrity attributes that are unserviceable from a single data source 202, 204. The client API 206 may submit data access requests to multiple data sources 202, 204, each specifically configured to accommodate some of the one or more performance and integrity attributes.

In at least one embodiment, the client API 206 may query each connected database 208, 210, 212, 214 to discover each database's corresponding capabilities, including dynamically as databases 208, 210, 212, 214 are added. Client applications may expect to have their performance and integrity attributes met, even in an embedded environment.

Figure 3:
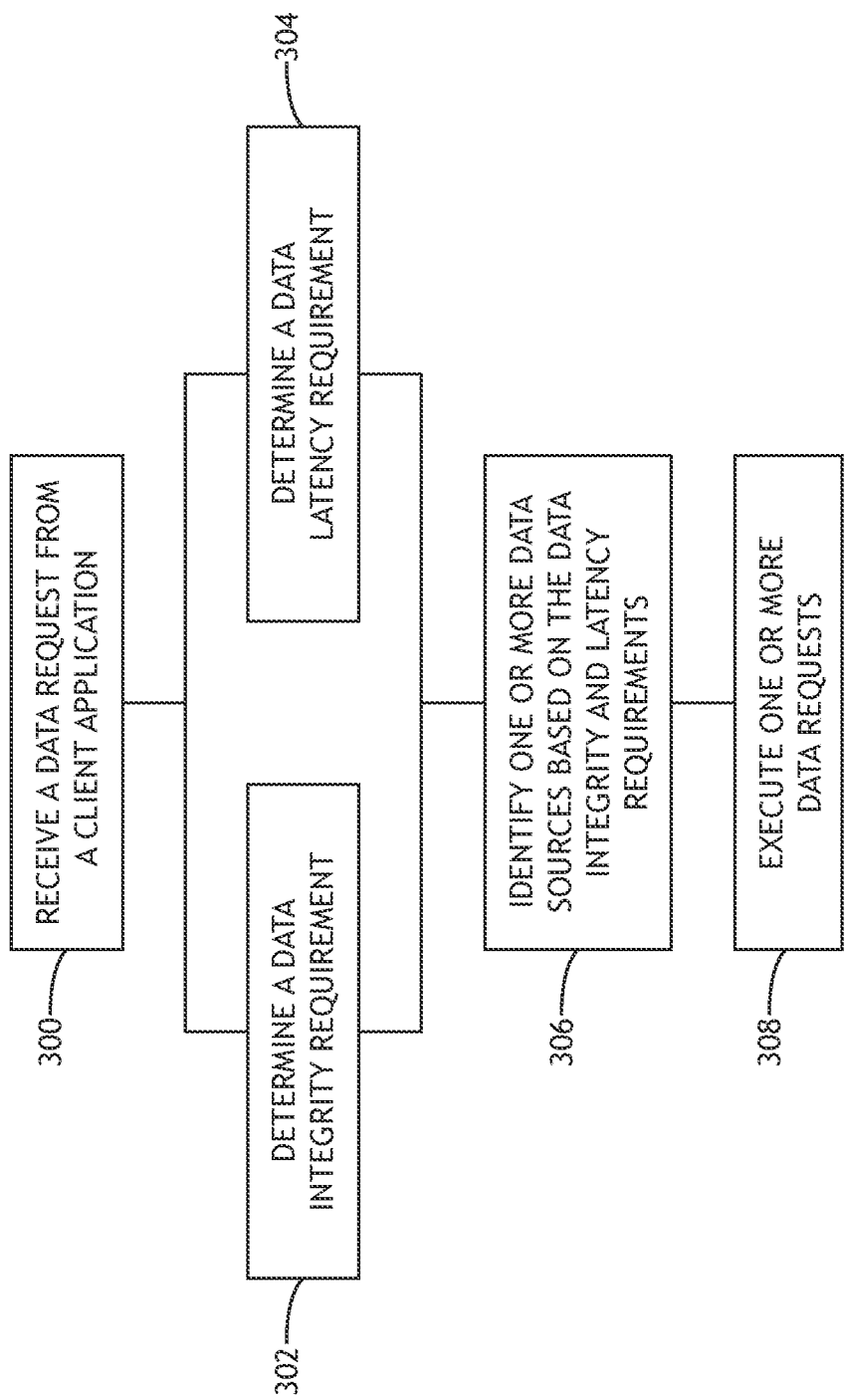
FIG. 3 shows a flowchart of a method according to an exemplary embodiment of the present disclosure.

Referring to FIG. 3, a flowchart of a method according to an exemplary embodiment of the present disclosure is shown. A client API is interposed in a data pathway between one or more client applications and one or more data sources. The client API receives 300 a data access request from one of the client applications. The data access request may include one or more performance and integrity attributes such as a desired maximum latency, a desired minimum data integrity, etc.

In at least one embodiment, the client API determines 302 a data integrity requirement and/or determines 304 a data latency requirement associated with the data access request. The data latency requirement and/or data integrity requirement may be received directly from the client application. Alternatively, or in addition, the client API may determine 302, 304 the integrity and latency requirements based on the identity of the client application, the nature of the data access request, etc.

The client API identifies 306 one or more data sources to process the data access request within the requirements dictated by the one or more performance and integrity attributes, and potentially one or more databases within those data sources. The client API then executes 308 the data access request and returns the resulting data to the client application.

The client API routes data request to the proper database instance to meet the required performance in a manner transparent to the client application. Each client application may address the client API as a single data source and otherwise treat the client API as a data source.

Embodiments of the present application facilitate high-integrity and low latency in a cost-effective manner by allowing the use of both bulk and high-speed storage in a transparent manner. A client API according to the present application may improve startup time by removing the need for each separate client application to establish an independent database connection.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
a plurality of databases; and
at least one processor in data communication with a memory storing processor executable code for configuring the at least one processor to:
  establish a data connection to each of the plurality of databases;
  receive a data access request from a client application;
  determine one or more performance and integrity attributes associated with the data access request;
  identify one or more databases on the plurality of databases that conform to the one or more performance and integrity attributes;
  determine that a data integrity metric associated with the data access request is beyond a certain predefined threshold;
  execute the data access request on at least two databases in the plurality of databases, the number of databases issued data access requests being defined on a sliding scale based on the data integrity metric wherein a higher data integrity metric equates to more databases issued data access requests;
  compare data packets from the at least two databases cyclic redundancy checks (CRC); and
  deliver a resulting data packet to the client application.

2. The computer apparatus of claim 1, wherein the at least one processor is further configured to:
  query every database in the plurality of databases to determine a set of capabilities associated with each database; and
  maintain the sets of capabilities associated with each database.

3. The computer apparatus of claim 2, wherein the at least one processor is further configured to:
  characterize each database according to common sets of capabilities; and
  organize the plurality of databases into data sources of multiple databases based on the common sets of capabilities.

4. The computer apparatus of claim 3, wherein a first data source comprises databases employing low latency database technology and a second data source comprises databases employing bulk storage database technology.

5. The computer apparatus of claim 1, wherein determining the one or more performance and integrity attributes comprises identifying the client application and identifying a set of one or more performance and integrity attributes associated with the client application.

6. The computer apparatus of claim 1, wherein determining the one or more performance and integrity attributes comprises identifying one or more performance and integrity attributes associated with a type of data requested.

7. A method comprising:
establishing a data connection to each of a plurality of databases;
querying every database in the plurality of databases to determine a set of capabilities associated with each database;
maintaining the sets of capabilities associated with each database;
characterizing each database according to common sets of capabilities;
organizing the plurality of databases into data sources of multiple databases based on the common sets of capabilities;
receiving a data access request from a client application;
determining one or more performance and integrity attributes associated with the data access request;
identifying at least two data sources that conform to the one or more performance and integrity attributes;
determining that a data integrity metric associated with the data access request is beyond a certain predefined threshold;
determining that the data access request is unserviceable by a single data source based on the one or more performance and integrity attributes;

executing the data access request on at least two at data sources, each of the at least two data sources corresponding to distinct performance and integrity attributes;

comparing data packets from the at least two data sources via cyclic redundancy checks (CRC); and delivering a resulting data packet to the client application.

8. The method of claim 7, wherein a first data source comprises databases employing low latency database technology and a second data source comprises databases employing bulk storage database technology.

9. The method of claim 7, wherein determining the one or more performance and integrity attributes comprises identifying one or more performance and integrity attributes associated with a type of data requested.

10. An avionics system comprising:

a plurality of databases; and at least one processor in data communication with a memory storing processor executable code for configuring the at least one processor to:

establish a data connection to each of the plurality of databases;

receive a data access request from a client application;

determine one or more performance and integrity attributes associated with the data access request;

identify one or more databases on the plurality of databases that conform to the one or more performance and integrity attributes;

determine that a data integrity metric associated with the data access request is beyond a certain predefined threshold;

execute the data access request on at least two databases in the plurality of databases, the number of databases issued data access requests being defined on a sliding scale based on the data integrity metric wherein a higher data integrity metric equates to more databases issued data access requests;

compare data packets from the at least two databases cyclic redundancy checks (CRC); and deliver a resulting data packet to the client application.

11. The avionics system of claim 10, wherein the at least one processor is further configured to:

query every database in the plurality of databases to determine a set of capabilities associated with each database; and maintain the sets of capabilities associated with each database.

12. The avionics system of claim 11, wherein the at least one processor is further configured to:

characterize each database according to common sets of capabilities; and organize the plurality of databases into data sources of multiple databases based on the common sets of capabilities.

13. The avionics system of claim 12, wherein a first data source comprises databases employing low latency database technology and a second data source comprises databases employing bulk storage database technology.

14. The avionics system of claim 10, wherein determining the one or more performance and integrity attributes comprises identifying the client application and identifying a set of one or more performance and integrity attributes associated with the client application.

15. The avionics system of claim 10, wherein determining the one or more performance and integrity attributes comprises identifying one or more performance and integrity attributes associated with a type of data requested.

* * * * *